(12) United States Patent
Ho

(10) Patent No.: US 9,661,838 B1
(45) Date of Patent: May 30, 2017

(54) ELECTRIC DEVICE FOR KILLING INSECTS AND ANIMALS

(71) Applicant: Ivan Ho, Miami Beach, FL (US)

(72) Inventor: Ivan Ho, Miami Beach, FL (US)

(*) Notice: Subject to any disclaimer, the term of this patent is extended or adjusted under 35 U.S.C. 154(b) by 606 days.

(21) Appl. No.: 14/023,848

(22) Filed: Sep. 11, 2013

(51) Int. Cl.
*A01M 3/02* (2006.01)
*A01M 19/00* (2006.01)

(52) U.S. Cl.
CPC .............. *A01M 3/025* (2013.01); *A01M 3/02* (2013.01); *A01M 19/00* (2013.01)

(58) Field of Classification Search
CPC .......... A01M 3/00; A01M 3/02; A01M 3/025; A01M 3/027
USPC ......................... 43/112, 124, 132.1, 133, 137
See application file for complete search history.

(56) References Cited

U.S. PATENT DOCUMENTS

| | | | | |
|---|---|---|---|---|
| 2,881,554 A * | 4/1959 | Laine | ..................... | A01M 1/223 43/112 |
| 5,351,436 A * | 10/1994 | Spalding | ................. | A01M 3/02 43/137 |
| 5,519,963 A * | 5/1996 | Shih | ....................... | A01M 1/223 43/112 |
| 5,533,298 A * | 7/1996 | Teng | ..................... | A01M 1/223 43/112 |
| 6,105,306 A * | 8/2000 | Teng | ..................... | A01M 1/223 43/112 |
| 7,540,112 B1 * | 6/2009 | Crenshaw | ............... | A01M 3/02 43/137 |
| 8,181,385 B2 * | 5/2012 | Mars | ..................... | A01M 3/025 43/112 |
| 2007/0101639 A1 * | 5/2007 | Huang | .................. | A01M 3/025 43/112 |
| 2007/0113464 A1 * | 5/2007 | Lan | ....................... | A01M 3/005 43/137 |
| 2007/0271839 A1 * | 11/2007 | Su | ......................... | A01M 3/025 43/112 |
| 2009/0272026 A1 * | 11/2009 | Su | ......................... | A01M 3/025 43/137 |
| 2010/0132247 A1 * | 6/2010 | Borovicka | ............ | A01M 3/025 43/137 |
| 2010/0162615 A1 * | 7/2010 | Keralla | ................. | A01M 3/025 43/112 |
| 2011/0154717 A1 * | 6/2011 | Hung | .................... | A01M 3/025 43/112 |
| 2013/0025186 A1 * | 1/2013 | Scheubeck | .............. | A01M 3/02 43/137 |
| 2014/0165454 A1 * | 6/2014 | Gordon, IV | .......... | A01M 3/025 43/137 |

* cited by examiner

*Primary Examiner* — David Parsley
(74) *Attorney, Agent, or Firm* — Albert Bordas, P.A.

(57) ABSTRACT

An electric device for killing insects and animals having a mesh surface holding assembly having at least one a conductive mesh surface, an electrical power source for providing electricity to the mesh surface, at least one light source constructed and positioned to provide backlighting on the mesh surface, an actuator for selectively initiating and ceasing supply of electrical power from the electrical source to the mesh by incorporated circuitry, and a handle assembly supporting the mesh surface assembly.

13 Claims, 3 Drawing Sheets

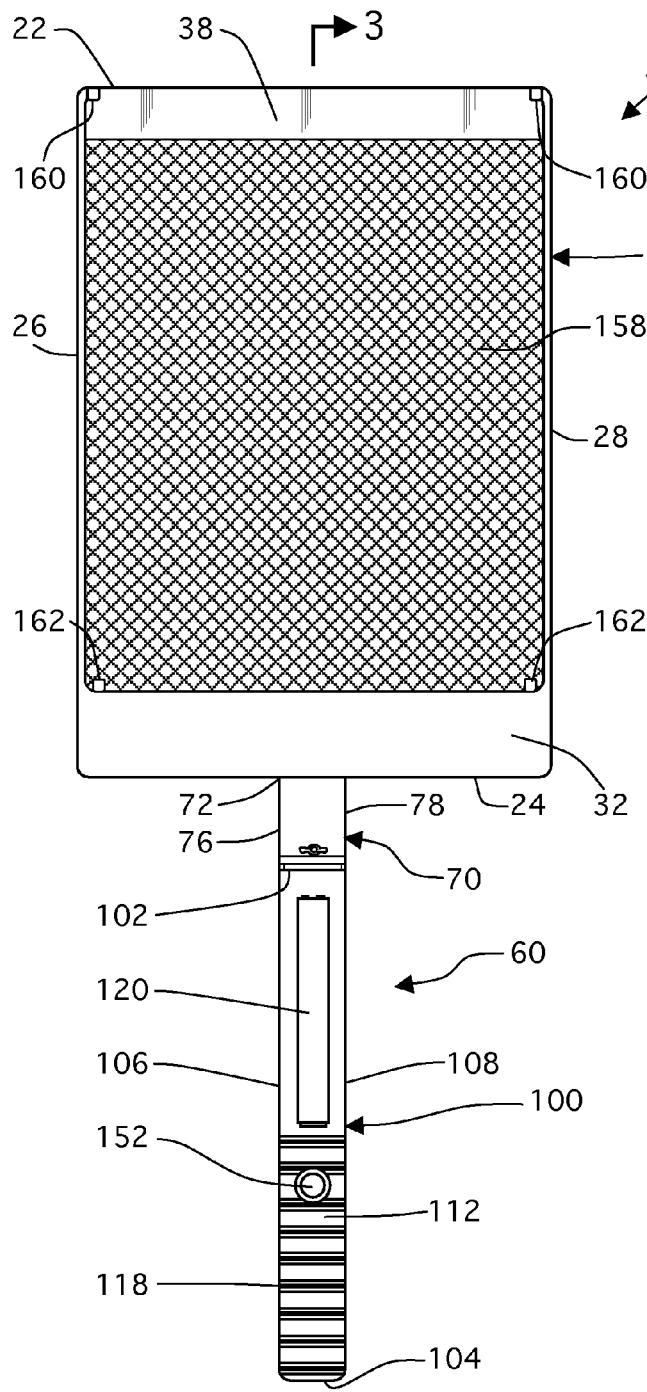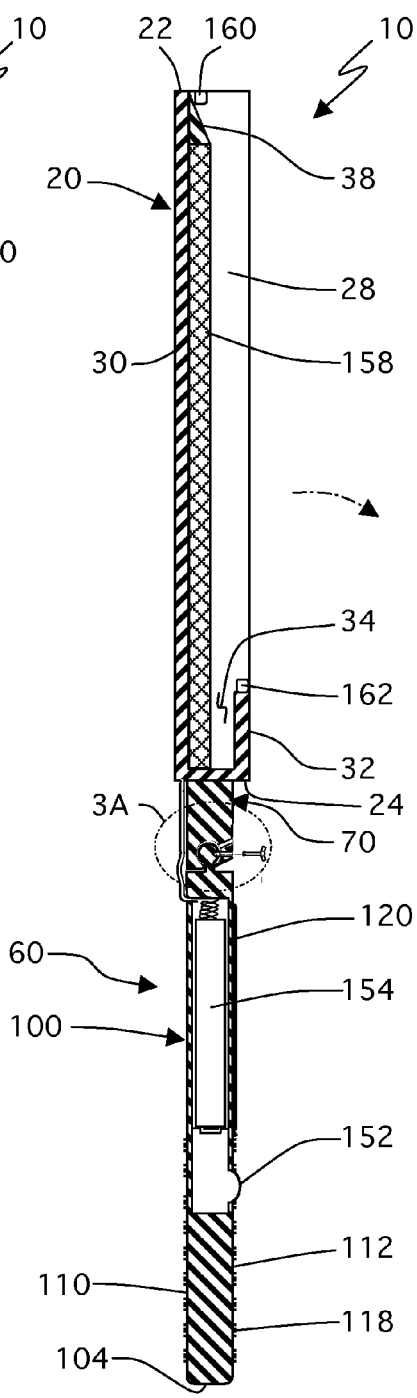

ELECTRIC DEVICE FOR KILLING INSECTS AND ANIMALS

BACKGROUND OF THE INVENTION

1. Field of the Invention

The present invention relates to electric devices, and more particularly, to an electric device for killing insects and animals.

2. Description of the Related Art

Several electric devices for killing insects and animals have been designed in the past. However, Applicant is not aware of any electric devices suggesting the novel features of the present invention.

SUMMARY OF THE INVENTION

The instant invention is an electric device for killing insects and animals, comprising a mesh surface holding assembly having at least one a conductive mesh surface. An electrical power source provides electricity to the mesh surface. At least one light source is positioned to provide backlighting on the mesh surface. An actuator for selectively initiates and ceases supply of electrical power from the electrical source to the mesh by incorporated circuitry. A handle assembly supports the mesh surface assembly.

The conductive mesh surface holding assembly is a swatter assembly. In one embodiment, the mesh surface holding assembly is dependent on a multi part handle assembly configured to adjust and lock into a position imparting an obtuse angular offset between said handle assembly and said mesh surface holding assembly when measured on a front side of said device. The front side of said device is the side that provides access to said mesh surface and the obtuse angular offset. In one embodiment as an example, the angular offset is between about 179° to 135°.

In one embodiment, the actuator is configured with a spring to urge said actuator outward from said device and imparts a closed electrical circuit on said device when no pressure is applied. As is known in the art, push button actuators require nominal force in a particular direction sufficient to overcome the action of springs. Upon application of sufficient pressure for push button actuators, as is known in the art, said actuator completes the electrical circuit and provides electricity through said circuitry to said mesh.

The circuitry provides sufficient voltage through appropriately configured circuitry to kill insects, and animals such as scorpions. In one example, the voltage can be between about 1000 to 2500 V DC to said mesh. In one embodiment, the device is activated, upon proximal activation by insect or animal near or on said conductive mesh, imparts an electrical discharge between about 20-45 µC. As an example, the term "near" refers to a proximal position of an insect near the conductive mesh from between approximately about 0.1 to 15 mm, although it can be a shorter or longer distance. As an example, the includes at least one capacitor configured to between about 10-45 nF per 1000V of charge.

In one embodiment, the device includes at lease one light source at or near the planer surface of said conductive mesh wherein the light source is positioned within the periphery of side walls of said mesh surface holding assembly. That is to say, the light does not extend outward from the periphery from the mesh surface holding assembly.

In one embodiment, the mesh surface holding assembly includes a cavity between said conductive mesh surface and a rear wall of said mesh surface holding assembly preferably with at least one cavity access orifice constructed thereon. The cavity is constructed and arranged to receive insects and insect parts from insects killed by the device. The electrical power source is provided by at least one of a battery or other electrical storage component.

It is therefore one of the main objects of the present invention to provide an electric device for killing insects and animals that kills insects by contact or proximal location.

It is another object of this invention to provide an electric device for killing insects and animals, which may cover a large area when a user swings it around.

It is another object of this invention to provide an electric device for killing insects and animals that is volumetrically efficient for carrying, transporting, and storage.

It is another object of this invention to provide an electric device for killing insects and animals that can be readily assembled and disassembled without the need of any special tools.

It is another object of this invention to provide an electric device for killing insects and animals, which is of a durable and reliable construction.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 2 is a front view of the electronic device for killing insects and animals.

FIG. 3 is a side view of the electronic device for killing insects and animals.

DETAILED DESCRIPTION OF THE PREFERRED EMBODIMENT

Figure 1:
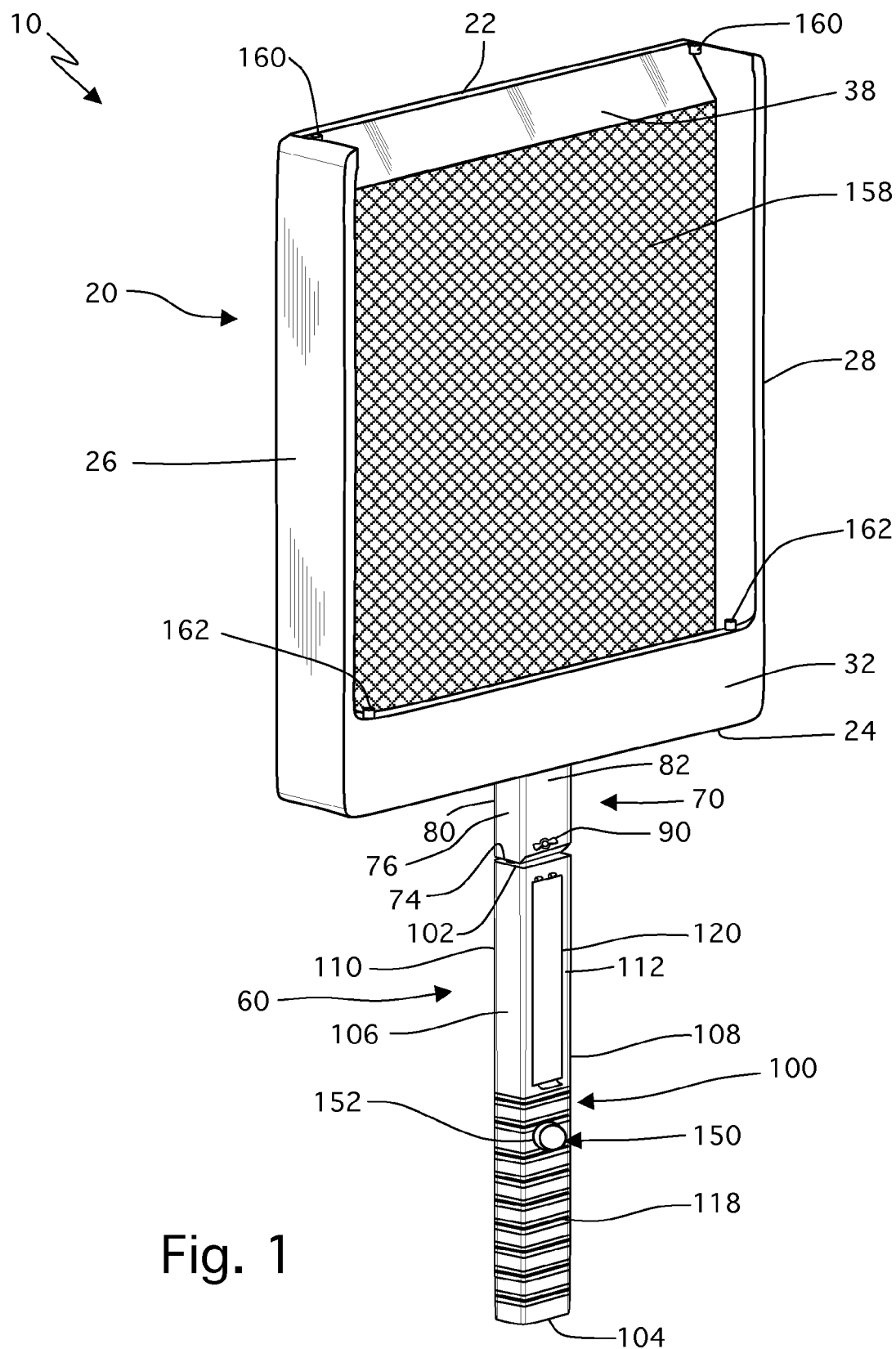
FIG. 1 represents an isometric view of an electric device for killing insects and animals.

Referring now to the drawings, the present invention is generally referred to with numeral 10. The overall device 10 has swatter assembly 20 that is supported generally by handle assembly 60. Swatter assembly 20 includes front wall 32, first lateral wall 26, second lateral wall 28, top wall 22, bottom wall 24, and rear wall 30. Swatter assembly 20 further includes cavity 34. Swatter assembly 20 is formed on one face with conductive electrical mesh 158 affixed by support member 38 on rear wall 30. A first pair of light emitting diodes (LED) 160 and a second pair of LED 162 are on swatter assembly 20.

In one embodiment, handle assembly 60 includes handle 100 and actuating extension 70. Swatter assembly 20 is generally supported on actuating extension 70 by an acceptable means. In one embodiment, handle 100 has lateral walls 106 and 108, rear wall 110, and front wall 112; and actuating extension 70 has an end 72, a first lateral wall 76, second lateral wall 78, rear wall 80, and front wall 82.

Figure 3A:
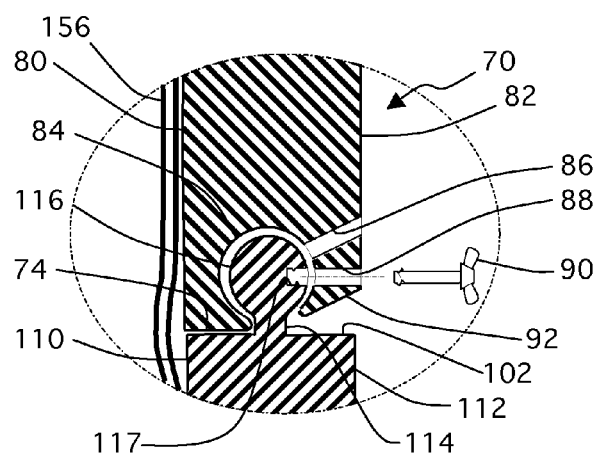
FIG. 3A is a close up expanded cross-section view of a hinge portion of the device for killing insects and animals.
Figure 4A:
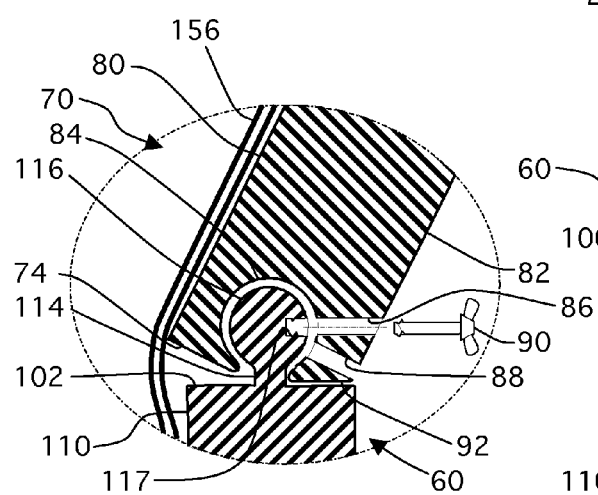
FIG. 4A is a close up expanded cross-section view of the hinge portion of the device for killing insects and animals.
Figure 4:
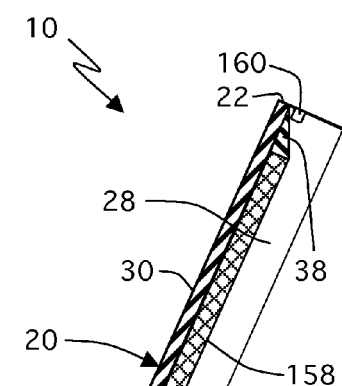
FIG. 4 is a side view of the electronic device for killing insects and animals in an angular configuration.

As seen in FIGS. 3, 3A, 4 and 4A, one embodiment provides actuating extension 70 configured with a ball and socket hinge type configuration in order that device 10 is configured to impart an angular offset 180 as best seen in FIG. 4. Handle 100 is incorporated with elongated knuckle 116 on neck 114 that is formed to mate with elongated socket 84 of actuating extension 70. Screw 90 is positioned in hole 86 and is positioned to contact elongated knuckle 116 at threaded aperture 117. As is known in the art, screw 90 will tighten into place, and by virtue of exertion of inward tension on elongated knuckle 116, will lock the assembly into a position as desired. The desired position is any one of an approximately vertical position as best seen in FIG. 3 or a selected angular offset as best shown in FIG. 4. In one embodiment, screw 90 is inserted into hole 88 to impart a configuration as in FIG. 3 that does not have an angular offset. Actuating extension 70 is formed with angled wall 92 that provides a gap between angled wall 92 and end 102 of actuating extension 70 wherein the gap provides a configuration that allows for actuating extension 70 to be positioned in an angular offset configuration as best demonstrated in FIG. 3A and FIG. 3B. Actuating extension 70 further has end 74 that positions near end 102 of handle 100, as best seen in FIG. 3A and FIG. 4A.

Handle 100 is configured with end 102 and end 104. In one embodiment, handle 100 has disposed there on a grip section 118. Handle 100 further houses electrical system 150 including actuation switch, also referred to as actuator, 152, battery 154, and electrical wires 156 that are constructed and arranged to provide electrical power to device 10. Battery 154 is contained within handle 100 and accessible through removable battery cover 120.

A user will be supplied with device 10 of the present invention. The user will then decide if device 10 will be used in a strictly linear configuration as demonstrated in FIG. 3 or if any type of angular offset 180 such as that shown in FIG. 4 is desired. In a preferred embodiment, angular offset 180 ranges from about 179° to 135° as the obtuse angle demonstrated in FIG. 4. If an angular offset is desired the user will use adjusting screw 90 position device can according to the desired angular offset and reinsert and tighten screw 90 in order to apply tension to elongated knuckle 116 and secure the device into a desired configuration. The user will then activate the electrical components of the device through actuating switch 152. The electrical components provide an electrical charge to electrical mesh 158 that is constructed and arranged to electrocute insects and/or animals upon contact.

LED lights 162 are configured to be with in the periphery of swatter assembly 20 so as not to protrude beyond the periphery. The positioning of LED lights 162 is demonstrated in each of FIG. 3 and FIG. 4. This configuration provides that LED lights 162 do not interfere with the use of device 10. LED lights 160 are constructed and arranged to provide back lighting through electrical mesh 158 in order that a user can ascertain whether any insect or other animal is present on electrical mesh 158 during use. For example, if a user has doubt as to whether a particular insect has been electrocuted on electrical mesh 158, LED lights 160 provide backlights to electrical mesh 158 and the presence of an insect or part there of will indicate to a user that the insect has been electrocuted.

It is further contemplated that any one or both of LED lights 160 or LED lights 162 may further serve the function of attracting insects and/or animals to be electrocuted by device 10 while in use. In this configuration, any one or both of her LED lights 160 or LED lights 162 are configured with a luminous and/or light wavelength material known to attract insects.

In one embodiment, actuation switch 152 is constructed and arranged with an internal spring that urges actuation switch 152 outward from handle 100 into an "off" position. A user will have to apply continual pressure on actuation switch 152 in order to continue electrical power supply to device 10. When a user releases actuation switch 152 the internal spring formation will urge actuation switch 152 outward disrupt the actuated electrical connection and cease power supply to device 10.

In one embodiment, the device is configured with a circuit is having an electronic oscillator, a step-up transformer and a voltage multiplier.

In one embodiment, electrical mesh 158 is electrically charged to a voltage of between about 1000 and 2500 V DC. When the electrically conductive body of an insect approaches the surface, the insect body nearly bridges the gap between electrodes (i.e. individual electrical mesh 158 strands), a spark jumps through the insect's body. A capacitor attached to electrical mesh 158 discharges during the spark, and this initial discharge typically either stuns or kills the insect.

The present invention is configured to electrical safety standards for humans. As an example, the safe configuration includes, but is not limited to a limit on the charge stored in the capacitor; and a discharge of less than 45 µC (micro coulombs). By way of non-limiting example, as is known in the art, a capacitor of a 1000 V is less than 45 nF (nano faraday). Additionally, in one embodiment, there is a limit on the current after the initial discharge of 0.1 to about 5 mA.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An electric device for killing insects and animals, comprising:
   A) a mesh surface holding assembly having at least one conductive mesh surface, a front wall, first and second lateral walls, a top wall, a bottom wall, a rear wall, and an angled support member that is affixed on said rear wall, said mesh surface holding assembly further includes a cavity defined between said at least one conductive mesh surface, said front wall, said bottom wall, and said first and second lateral walls, said first and second lateral walls are approximately parallel, said angled support member extends between said first and second lateral walls and extends from said top wall a predetermined distance to said at least one conductive mesh surface;
   B) an electrical power source for providing electricity to said at least one conductive mesh surface;
   C) first at least two light sources constructed and positioned to provide backlighting on said at least one conductive mesh surface, said first at least two light sources positioned at ends of said first and second lateral walls and adjacent said angled support member, said angled support member defining a ramp that is inclined from said top wall toward said bottom wall at a top of said mesh surface, and second at least two light sources proximate said cavity and all of said light sources having portions facing said mesh surface;

D) an actuator for selectively initiating and ceasing supply of electrical power from said electrical power source to said at least one conductive mesh surface by incorporated circuitry; and E) a handle assembly comprising a handle and an actuating extension supporting said mesh surface holding assembly, whereby said actuating extension extends from said bottom wall, said mesh surface holding assembly is dependent on said handle assembly that is configured to adjust and lock into a position imparting an obtuse angular offset between said handle assembly and said mesh surface holding assembly when measured on a front side of said device.

2. The electric device for killing insects and animals set forth in claim 1, further characterized in that said mesh surface holding assembly is a swatter assembly.

3. The electric device for killing insects and animals set forth in claim 1, further characterized in that said front side of said device provides access to said at least one conductive mesh surface.

4. The electric device for killing insects and animals set forth in claim 1, further characterized in that said obtuse angular offset is 179° to 135°.

5. The electric device for killing insects and animals set forth in claim 1, further characterized in that said actuator is configured to urge outwardly from said device and imparts a closed electrical circuit on said device.

6. The electric device for killing insects and animals set forth in claim 5, further characterized in that upon application of sufficient to said actuator, said actuator completes said electrical circuit and provides electricity through said circuitry to said at least one conductive mesh surface.

7. The electric device for killing insects and animals set forth in claim 1, further characterized in that said circuitry imparts voltage to said at least one conductive mesh surface.

8. The electric device for killing insects and animals set forth in claim 1, further characterized in that proximal activation by insect or animal near or on said at least one conductive mesh surface imparts an electrical discharge.

9. The electric device for killing insects and animals set forth in claim 1, further comprising a capacitor.

10. The electric device for killing insects and animals set forth in claim 1, whereby said first at lease two light sources are at or near a planer surface of said at least one conductive mesh surface.

11. The electric device for killing insects and animals set forth in claim 10, further characterized in that said first at least two light sources are positioned within a periphery of said first and second lateral walls.

12. The electric device for killing insects and animals set forth in claim 1, further characterized in that said cavity is constructed and arranged to receive insects and insect parts from insects killed.

13. The electric device for killing insects and animals set forth in claim 1, further characterized in that said electrical power source is provided by at least one battery or electrical storage component.

\* \* \* \* \*